Nov. 25, 1952     A. C. LOEDDING     2,619,302
LOW ASPECT RATIO AIRCRAFT
Filed Aug. 25, 1948     3 Sheets-Sheet 1
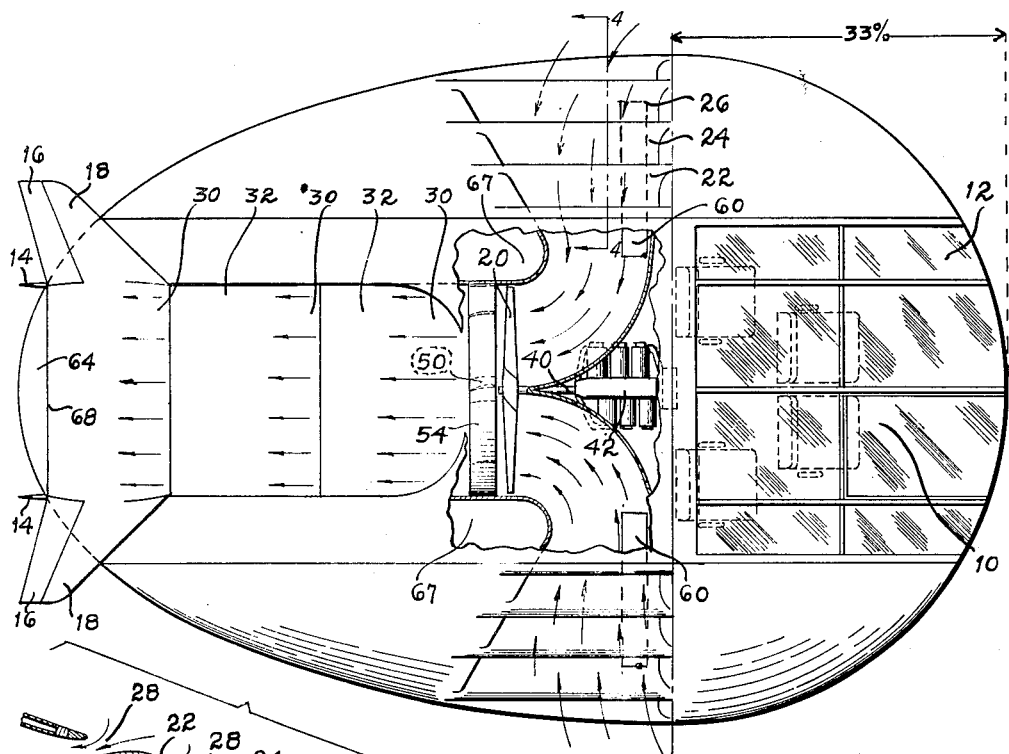
FIG. 1
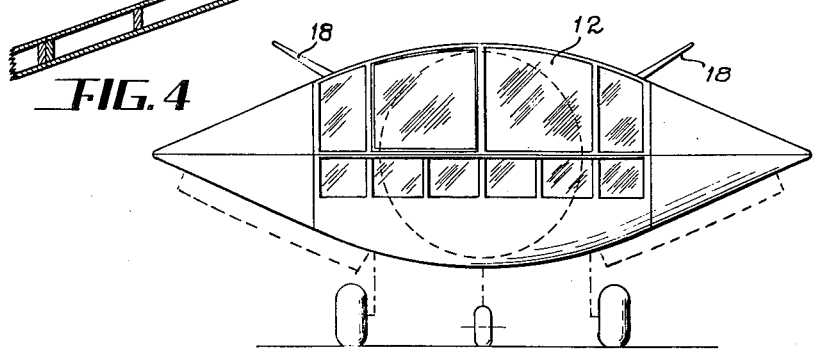
FIG. 4
FIG. 2
INVENTOR.
ALFRED C. LOEDDING
BY Dybvig & Dybvig
HIS ATTORNEYS

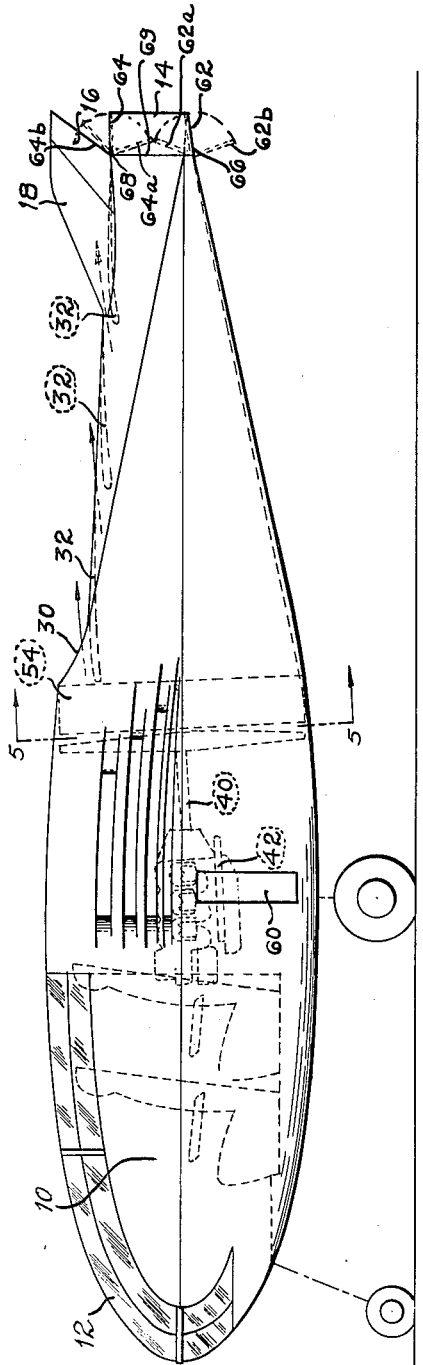

Nov. 25, 1952  A. C. LOEDDING  2,619,302
LOW ASPECT RATIO AIRCRAFT
Filed Aug. 25, 1948  3 Sheets-Sheet 3

INVENTOR.
ALFRED C. LOEDDING
BY
Dybvig & Dybvig
HIS ATTORNEYS

Patented Nov. 25, 1952

2,619,302

UNITED STATES PATENT OFFICE 2,619,302

LOW ASPECT RATIO AIRCRAFT

Alfred C. Loedding, Dayton, Ohio

Application August 25, 1948, Serial No. 45,992

3 Claims. (Cl. 244—15)

This invention relates to an aircraft and more particularly to an aircraft having a low aspect ratio.

In the conventional airplanes of both the propeller and jet propelled type, there is usually provided two, or a multiple of two, laterally extending well defined wings forming a part of an airplane having a comparatively high aspect ratio. As is well known to those skilled in the art, in the conventional airplanes now in use the thrust of the propeller decreases very rapidly from a static aircraft at rest condition to one where the airplane travels at a high rate of speed. In other words, the thrust of the propeller goes down as the velocity of the airplane increases. Furthermore, the airfoil in passing through air produces a well known boundary layer of relatively stagnant air near the upper trailing portion of the airfoil, which stagnant air has a detrimental aerodynamic effect. Various methods have been proposed for overcoming this objectionable feature. For example, in the patent to Jones No. 1,980,140 dated November 6, 1934, there is shown slots extending through the wings functioning as air passages. Other methods have been proposed for eliminating the accumulation of such stagnant air or boundary layer.

An object of my invention is to provide a low aspect ratio airplane that has great stability, high lift characteristics that can be efficiently utilized for vertical or near vertical take-off and rapid climb and at the same time adapted for high speed propulsion.

Another object of this invention is to provide an airplane which might be referred to as an airplane of the flying wing type, wherein the wing and housing portion cooperate to form a continuous gradually curving periphery.

Another object of this invention is to provide a propeller that is housed within the airplane that has the characteristics simulating a static condition even though the airplane travels at high velocity through the air.

Another object of this invention is to provide a mode of propulsion wherein the propeller is mounted within the aircraft, drawing the air in laterally, so as to produce resultant lower drag components normal to the direction of flight, equal and opposite to each other to thereby cancel each other, the propeller while actually propelling the air operating over a much larger area than the cross sectional area of the exit port of the air flow, thereby permitting the propeller to propel the air at a much lower velocity in the vicinity of the propeller than the velocity of the air that is being expelled through the air expulsion port.

Another object of this invention is to provide a mode of propulsion wherein the boundary layer air is drawn into the airplane laterally and expelled to the rear in a direction parallel to the direction of flight. The air upon being acted upon by the propeller results in a turbulent and rotary motion generally referred to as a slip stream which is later removed so as to cause the air being expelled through the exhaust port and louvers on the upper surface of the aircraft to travel in a substantially straight path parallel to the direction of flight.

Another object of this invention is to provide hollow airfoils or louvers around which the air used in propelling the airplane passes while flowing towards the propeller and also from the propeller, the passages through the airfoils being used as heat transfer elements.

Another object of this invention is to provide an aircraft that has ample ruggedness and rigidity; excellent visibility; structural simplicity; roominess; unrestricted disposition of load in spanwise direction; a minimum of protuberances (that is, absence of fuselage, nacelles, wing tanks, et cetera); low wing loading; high obtainable lift; positive control to maintain almost any flight attitude, particularly at very low speeds and also very high altitudes; low percent thickness of airfoil sections to meet high speed requirements and still provide adequate depth for complete housing of all components due to the fact that the length is greater than the span; practical solution to mechanical problem for efficient utilization of boundary layer removal and obtaining a so-called flow control of the free air displaced by the aircraft; and large mean aerodynamic chord relative to span to obtain large Reynolds' number and hence, large scale effect, particularly for small sized aircraft.

Another object of this invention is to utilize the entire primary power plant in conjunction with a comparatively large fan disc area for the production of boundary layer removal and free air stream flow control.

Another object of this invention is to provide suction for removing boundary layer air at the tip portions as well as utilizing the wing tip vortex flow to simulate static thrust conditions, besides preventing its normal adverse aerodynamic effect, so as to greatly reduce drag by a co-action of suction and partial consumption of tip vortex or spanwise flow, which causes free air to flow in a controlled manner from the tip through the entrance louvers towards the center and thence rearwardly, which, in effect, turns the lift component of the louver portions towards the center, which tends to produce a spanwise compression load on the aircraft instead of a drag fore and aft force.

Other objects and advantages reside in the construction of parts, the combination thereof and the mode of operation, as will become more apparent from the following description.

In the drawings, Figure 1 is a top plan view of my preferred embodiment of a low aspect ratio airplane.

Figure 2 is a front elevational view of the airplane shown in Figure 1.

Figure 3 is a side elevational view thereof.

Figure 4 is a fragmentary, cross sectional view, taken substantially on the line 4—4 of Figure 1.

Figure 5 is a transverse, cross sectional view, taken substantially on the line 5—5 of Figure 3.

Figure 6 is a cross sectional view of an air straightener, taken substantially on the line 6—6 of Figure 5.

Figure 7:
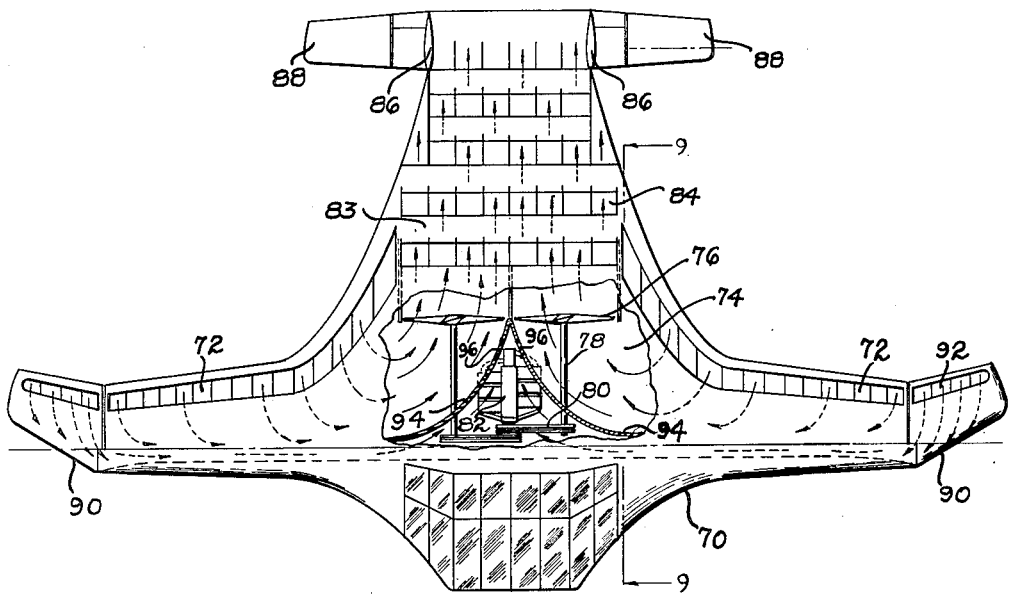
Figure 7 is a top plan view of a modification.

Certain aerodynamic improvements due to boundary layer removal have been recognized and appreciated by many aeronautical scientists for years. Its full utilization is mainly a mechanical problem, which, prior to my invention, has remained without a practical solution. In my invention all the primary power energy is devoted to the removal of boundary layer and to provide proper external flow control. The arrangement is such that the mass flow is sufficiently large to provide the required propulsion for at least all subsonic flight conditions. An ideal configuration is provided which will allow its use efficiently, both from the standpoint of external and internal air flows. The total horsepower available can be employed to produce a high aspect ratio effect. Empirically, in the absence of an exact theory, the thrust which is the product of unit air mass flow and velocity and therefore a direct measure of air flow energy devoted to such control and effect may be used to replace the aspect ratio factor A in the well known induced drag formula $$C_{D_i} = C_L^2 / \pi A$$

Where $C_{D_i}$ represents the usual non-dimensional induced drag coefficient;

$C_L$ represents the usual non-dimensional lift coefficient; and $A$ represents aspect ratio, which is the span squared divided by area.

This empirical substitution may prove valid if expressed as thrust in terms of propeller or fan disc area and wing area adjusted by a constant (C) to be determined by actual tests. The formula would now read:

$$C_{D_i} = \frac{C_L^2}{\pi K} X C$$

Where $K$ = fan disc area times thrust divided by wing area.

Then $$\frac{1}{K}$$

= wing area (sq. ft.) divided by fan disc area (sq. ft.) × thrust (lbs.) at given flight conditions.

As an example, assume wing area 300 sq. ft. Disc area of propeller is 20 sq. ft. and maximum thrust is 600 lbs. at a specific flight condition.

Then $$K = \frac{20 \times 600}{300} = 40 \text{ (neglecting units)}$$

Aspect ratio factor A therefore would change from 0.85 to 40 provided C=1. It is anticipated that C would have practical values from .3 to unity. Thus, such a low aspect ratio arrangement would compare favorably with present-day long range type conventional aircraft for a C value of only 0.3. The effect would be astounding and result in aircraft performance several times better than the best conventional aircraft by use of adequate power and good design of air duct system and fan or blower.

The airplane disclosed in the preferred embodiment is substantially oval; thereby having an extremely low aspect ratio and at the same time great stability and maneuverability. Instead of having an externally located propeller, as now in general use, the propeller is located within the airplane and so arranged that the boundary layer and spanwise flow induced by tip vortex effect is drawn in laterally, then propelled rearwardly by a fan or blower or propeller, straightened and expelled through suitable openings located in the rear upper portion and aft of the airplane.

As best viewed in Figure 1, the horizontal peripheral outline of the preferred embodiment is substantially oval. Furthermore, as best seen in Figure 3, the peripheral appearance, as viewed from the side, is substantially tear-shaped. This arrangement eliminates the use of the conventional fuselage or cabin, in that, as best seen in Figures 1 and 3, the seats for the pilot, et cetera, are located in the forward portion 10 of the main body of the airplane. Suitable portions of the outer surface, as illustrated at 12, may be provided with a translucent covering to provide the necessary visibility.

A pair of rudders 14 are used in steering the airplane, particularly at slow speed and transonic speed ranges. The angle of incidence, as well as direction, is controlled by elevons 16 attached to stabilizers 18. As may best be seen by referring to Figures 2 and 5, the stabilizers 18 form dihedral angles with the adjacent portion of the main body, to thereby give the airplane adequate lateral stability.

Figure 10:
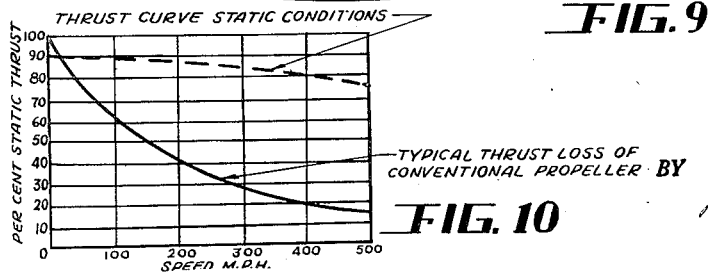
Figure 10 is a graphic illustration of thrust losses of a conventional propeller compared to a theoretical thrust curve of a propeller functioning as a pump simulating the static condition.

In conventional propellers the thrust decreases very rapidly as the speed of the airplane increases. For example, using a static thrust as 100%, the thrust at 500 miles per hour would be approximately 15%, as illustrated by the full line curve shown in Figure 10. If a propeller could be produced such that it would operate under conditions simulating static conditions, the thrust curve would probably simulate the dotted curve shown in Figure 10.

Furthermore, in conventional airplanes separation of the boundary layer creates a drag, which, of course, is objectionable.

In the device disclosed herein, the propeller 20 is mounted within the outside surface of the airplane. A plurality of louvers 22, 24 and 26 cooperate to form openings 28 in the sides of the airplane, so that the propeller 20 withdraws the boundary layer air as well as air flowing laterally from the tips and utilizes this air in propelling the airplane. Furthermore, the velocity of the air in the vicinity of the propeller is less than the velocity of the air passing through the openings 28 and is less than the velocity of the air exhausted or propelled through the openings 30 located in the vicinity of the louvers 32 positioned immediately in front of and above the tail. It is a well established phenomenon that a propeller has greater efficiency at lower velocity levels where the compressibility effects are less. When approaching the well known Mach number of 1 (M=1.0), the ratio of speed or local flow velocity to the speed of sound, the effect of compressibility becomes very serious. Shock waves are evidenced and the drag increases at an abnormally high rate. When the local velocity is approximately 520 miles per hour at seat level, M is then only 0.7, and compressibility is just beginning to be evidenced.

The propeller 20 is mounted on the propeller shaft 40 driven by any suitable type of engine 42 mounted within the airplane. A liquid-cooled type engine 42 may be efficiently employed. The liquid coolant used in cooling the engine may be circulated through the ducts 44 in the louvers 26, as best seen in Figure 4. Thus, the louvers 26 may function as radiators for the coolant. Some of these louvers may be used as radiators for the oil. By mounting the engine or the power plane entirely within the airplane, a practical solution of coping with extremely low temperature operations, as for example, in the Arctic regions or at very high altitudes, is thereby attained. Furthermore, it is a comparatively easy matter to pre-heat the air used in carburetion.

When a single propeller is used, rotating in one direction, the propelled air creates a vortex, that is, a twisting effect. This is an undesirable movement of the air for the proper flight of the airplane disclosed herein. That being the case, a plurality of straightener vanes 50 mounted between the hub 52 and the rim 54 are positioned near the propeller 20. The vanes 50 are preferably hollow, so as to form ducts 56 that may be used as a heat exchanger, either for the coolant or for the crankcase oil. The air, in passing from the propeller through the straightener, increases in velocity, due to the tapering contour of the air exhaust passage. The air escapes between the louvers 32, so as to propel the aircraft in a manner similar to jet propulsion. Arrangements employing counter-rotating dual propellers may eliminate entirely the need for the vanes 50.

Suitable trap doors 60 may be opened in the event the engine stalls. These doors could then be opened, as shown in dotted lines in Figure 2, dropping down, so that if the engine stalls, air can rush in, due to natural pressure differentials between the lower and upper surfaces. The doors will also serve as air brakes to increase the drag, thereby slowing down the airplane to effect a slow, safe landing. These doors have been shown as extending in a direction substantially normal to the longitudinal axis of the airplane. These doors could be diagonally disposed or angularly disposed with respect to the longitudinal axis of the aircraft, to thereby aid in the control of the aircraft.

The top part of the airplane could be made from porous material. Portions of the upper and lower wing surfaces may be porous to permit efficient entrance of air to the interior in conjunction with the openings shown or without them. The porous material should be so selected that it is possible to maintain surface continuity and smoothness. Furthermore, these porous areas should be so selected as not to interfere with the internal and external air pressures in areas of the plane where changes in air pressure are objectionable. At the same time, the porous areas should offer a minimum resistance to air entering into the ducting system, so as to maintain high thrust of the propeller.

The aircraft, both in flight and while landing or hovering, may be controlled by trim and thrust control members 62 and 64 pivoted along the lines 66 and 68 respectively to the main body of the tail portion. These trim and thrust members 62 and 64 subtend an opening 69, which forms a rather large opening in the rear end of the tail of the airplane. This large opening functions as an exhaust passage for the air propelled by the propeller. By actuating members 62 and 64 into the dot dash position 62a and 64a, the flow of air through the opening 69 is greatly restricted. This shifts the angle of the effective thrust created by the propellers exhausting the air. It also produces the greatest lift for possible hovering by forcing the air out through the openings 30. Furthermore, immediate high thrust is also possible by suddenly adjusting the surfaces from a restricted position into the full line positions 62 and 64, that is, into their neutral positions, without increasing the engine speed. By actuating the thrust control members into the position 62b and 64b, these trim and thrust control members function as drag elements. Furthermore, these members may be used in controlling the angle of incidence by adjusting one or the other out of the horizontal plane.

The load or cargo in this type of airplane is preferably carried ahead of the 33% point, as measured from the front of the airplane. Everything to the rear of the 33% point, or substantially so, is used as a space for the power plant, the propeller or fan arrangement and the air passages, to thereby secure adequate air flow through the airplane. The configuration is substantially oval, or tear-shaped, as viewed from the top or upwardly from the bottom. The side of the airplane also is what might be referred to in general as an oval contour or a tear-shaped contour.

The propulsion of the airplane may be accomplished by or aided by the use of turbo-jet engines that could be located in the space 67 on either side of the air passage conduit or channel. By locating the turbo-jet engines, not shown, in this space, the flow of the air could be accelerated and also the flow of the air around the rather abrupt corners adjacent this space could be facilitated.

These turbo-jet engines can be used either as a sole source of power or as an auxiliary source of power. If used as an auxiliary source of power, they could, in case of emergency, be used as the sole source of power or they could be used to augment the internal combustion engines for super-performance. In the event the turbo-jet engines are used as a sole source of power and the only source of power, the engine 42 would be eliminated; but not necessarily the propeller 20 and the straighteners 54. These parts could be retained. The turbo-jet engine exhaust is preferably directed out through the center of the channel.

The removal of the boundary layer air and the enclosed power plant are adaptable for universal use.

Figure 8:
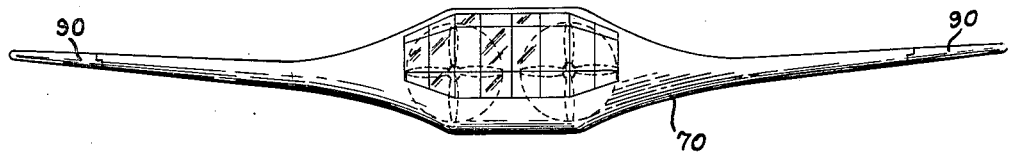
Figure 8 is a front elevational view of the airplane shown in Figure 7.
Figure 9:
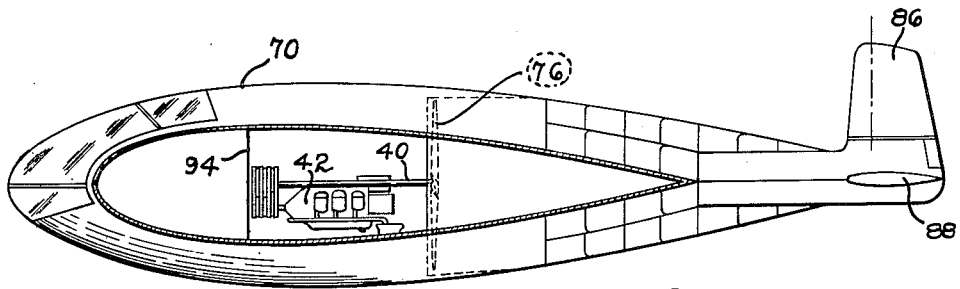
Figure 9 is a cross sectional view, taken substantially on the line 9—9 of Figure 7.

The modification disclosed in Figures 7, 8 and 9 disclose a wing type airplane 70 that is similar in contour to the airplane disclosed in my Patent No. 2,118,254, patented May 24, 1938. The main body portions of the wings have been provided with slots or openings 72 along the top rear edge, communicating with a pair of air passages 74, there being one air passage in each wing. A pair of propellers 76, mounted within the airplane and upon the shafts 78 driven through V-belts 80 from a motor 82, are used in drawing air in through the openings 72 and exhausting the air between suitable louvers 83 or through openings 84 located towards the rear and upper surface of the main body of the airplane. The air exhausted from the rear of the airplane flows out in the vicinity of a pair of rudders 86 and the elevators 88. Control members 90, which have been described in my Patent No. 2,118,254, form wing tips. These control members 90 are provided with openings 92 located in the rear upper surface thereof. Air is drawn in through the openings 92 ahead of a partition member 94. Thus, air is supplied to the motor 82 to cool the same. Suitable vents or openings 96 in the curved portion of the partition member 94 cause the air drawn in through the openings 92 to be discharged through the apertures in the rear of the airplane. This arrangement disclosed herein removes the boundary layer air, the propellers operating so as to develop a high thrust. By utilizing two propellers driven through a suitable gear mechanism, so as to rotate in opposite directions, the torque resulting from the vortex generated by one propeller is cancelled or equalized by the torque resulting from the vortex generated by the other propeller.

The space in the airplane in front of the 33% line in the preferred embodiment and the space in the main body of the airplane in front of the partition 94 disclosed in the modification are each available as a load carrying space. In the preferred embodiment a large space is available for the load without increasing the overall height of the airplane beyond optimum efficiency. In the modification disclosed in Figures 7, 8 and 9, there may be a double partition, one for dividing the wing-like extensions into two passages, the rear passage for the flow of the air drawn in through the openings 72 and the leading passage for the flow of the air passing through the openings 92. The second partition could extend across the main body of the fuselage-like portion of the airplane in front of the leading passage, so as to prevent the cargo from obstructing the flow of air used in cooling the engine.

Although the preferred embodiment of the device has been described, it will be understood that within the purview of this invention various changes may be made in the form, details, proportions and arrangement of parts, the combination thereof and mode of operation, which generally stated consists in a device capable of carrying out the objects set forth, as disclosed and defined in the appended claims.

Having thus described my invention, I claim:

1. In a low aspect ratio airplane, the combination of an outer surface having a substantially continuous curvature provided with laterally disposed openings for removing boundary layer air, and provided with openings in the rear, said airplane having air passages extending from the lateral openings to the rear openings, with propeller means mounted within the airplane for drawing the air in through the lateral openings and exhausting it through the rear openings to thereby propel the airplane, and doors providing closures for auxiliary intake openings in the under side of the airplane, said doors being adapted to drop downwardly to provide drag elements for suddenly slowing down the airplane and for providing sufficient airflow through the air passages to maintain control to effect a slow safe landing.

2. In an airplane having a curved surface terminating in a pair of laterally disposed wing-like extensions, said wing-like extensions being provided with openings in the upper rear surface thereof, a partition through the wing-like extensions forming a portion of each of a pair of air passages, said passages communicating with the openings in the upper surface of the wing-like extensions and terminating in a common passage communicating with openings in the upper rear surface of the main body of the airplane, control tips extending outwardly from said wing-like extensions, openings in the upper rear surface of the control tips, said openings communicating with the first mentioned passages in the wing-like extensions, an engine located in front of the partition, and means driven by the engine located to the rear of the partition for removing the boundary layer air overlying the rear surface of the wing-like extensions and exhausting this air through the openings in the upper rear surface of the airplane to create a thrust for propelling the airplane, said partition having vent openings in the vicinity of the engine so as to draw the air overlying the rear portion of the control tips through the leading passage in the wing-like extensions to cool the engine.

3. In an airplane having a curved surface terminating in a pair of laterally disposed wing-like extensions, said wing-like extensions being provided wth openings in the upper rear surface thereof, a partition through the wing-like extensions forming a portion of each of a pair of air passages, said passages communicating with the openings in the upper surface of the wing-like extensions and terminating in a common passage communicating with openings in the upper rear surface of the main body of the airplane, control tips extending outwardly from said wing-like extensions, openings in the upper rear surface of the control tips, said openings communicating with the first mentioned passages in the wing-like extensions, an engine located in front of the partition, and a pair of propellers located to the rear of the partition and driven by the engine, said propellers removing the boundary layer air overlying the rear surface of the wing-like extensions and exhausting this air through the openings in the upper rear surface of the airplane to create a thrust for propelling the airplane, said partition having vent openings in the vicinity of the engine so as to draw the air overlying the rear portion of the control tips through the leading passage in the wing-like extensions to cool the engine.

ALFRED C. LOEDDING.

(References on following page)

REFERENCES CITED

The following references are of record in the file of this patent:

UNITED STATES PATENTS

| Number | Name | Date |
|---|---|---|
| 1,588,247 | Lyon | June 8, 1926 |
| 1,829,616 | Stalker | Oct. 27, 1931 |
| 1,922,167 | Leray | Aug. 15, 1933 |
| 2,006,805 | Gwinn | July 2, 1935 |
| 2,041,792 | Stalker | May 26, 1936 |
| 2,118,254 | Loedding | May 24, 1938 |
| 2,176,904 | Jackson | Oct. 24, 1939 |
| 2,219,234 | Messerschmitt | Oct. 22, 1940 |
| 2,340,396 | McDonnell | Feb. 1, 1944 |
| 2,372,301 | Stalker | Mar. 27, 1945 |
| 2,380,535 | McDevitt | July 31, 1945 |
| 2,397,215 | Stalker | Mar. 26, 1946 |
| 2,409,446 | Pavlecka et al. | Oct. 15, 1946 |
| 2,420,323 | Meyer et al. | May 13, 1947 |
| 2,430,820 | Lightfoot | Nov. 11, 1947 |
| 2,431,293 | Zimmerman | Nov. 18, 1947 |
| 2,509,890 | Stalker | May 30, 1950 |

FOREIGN PATENTS

| Number | Country | Date |
|---|---|---|
| 497,598 | Great Britain | July 6, 1937 |
| 512,064 | Great Britain | Aug. 29, 1939 |
| 547,589 | France | Sept. 27, 1922 |
| 394,245 | Germany | Apr. 22, 1927 |